Sept. 17, 1968     B. B. STRANGE ET AL     3,401,660
SEISMIC SHIP
Filed April 21, 1967
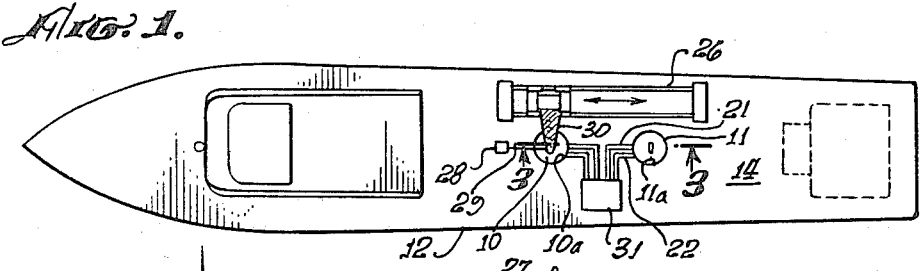
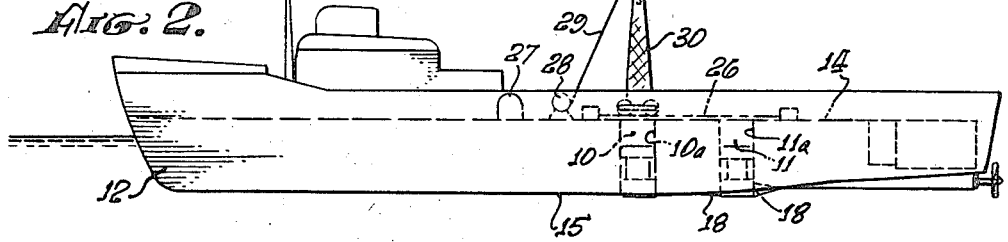
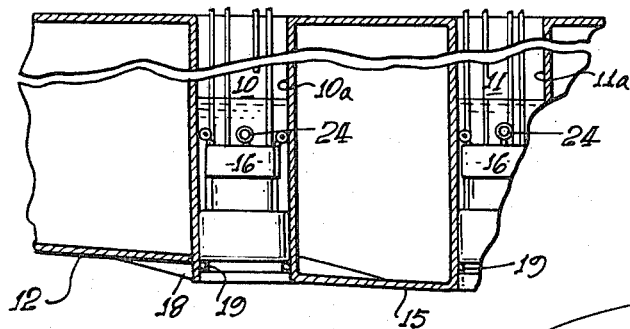
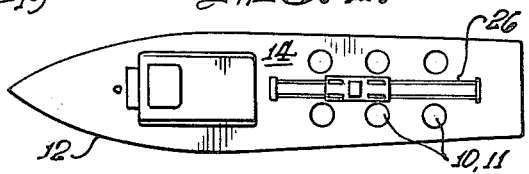
INVENTORS.
BOOTH B. STRANGE,
CARL H. SAVIT,
THOMAS L. SLAVEN,
By THEIR ATTORNEYS.
Spensley & Horn.

United States Patent Office 3,401,660
Patented Sept. 17, 1968

3,401,660
SEISMIC SHIP
Booth B. Strange, Houston, Tex., and Carl H. Savit, Van Nuys, and Thomas L. Slaven, Los Angeles, Calif., assignors to Western Geophysical Company of America, Los Angeles, Calif., a corporation of Delaware
Filed Apr. 21, 1967, Ser. No. 632,837
1 Claim. (Cl. 114—.5)

ABSTRACT OF THE DISCLOSURE

This invention relates to a vessel for use in marine seismic surveying. A seismic surveying vessel in accordance with the present invention comprises a self-propelled vessel with a well extending from the working deck of the vessel through the hull of the vessel to below the waterline. A seismic signal transmission apparatus is removably positioned within the well. The well and signal transmission apparatus therein are so constructed and arranged in the vessel that the bottom of the ship's hull acts as a substantial baffle for the signal transmission apparatus to provide efficiency of signal transmission not heretofore possible by seismic exploration vessels except by positioning the signal transmission point at an inconvenient depth beneath the water surface.

BACKGROUND OF THE INVENTION

1. Field of the invention

The reflection method of seismic surveying by which information concerning earth formations is obtained by transmitting vibrations from a first point at or near the surface of the earth downwardly into formation and measuring the reflected or refracted vibrations at one or more second points spaced along the earth's surface from the first point is, of course, well known. The most common means for generating such vibrations has been by the explosion of a shot at or near the earth's surface. In the recent past, the seismic surveying of geologic formations underlying bodies of water has become increasingly important. Additionally, various methods for generating vibrations other than by explosives have also been developed and made a practicality. Such methods include those as described in U.S. Patent No. 3,124,781 to Loper et al., issued Mar. 10, 1964, and U.S. Patent No. 3,235,027 to Kilmer, issued Feb. 15, 1966, by which the vibratory signals to be reflected and detected are generated by the repetitive production of small signals, rather than by the single generation of an explosion. Another method of generating signals to be reflected for seismographic exploration is described in U.S. Patent No. 2,688,124 issued Aug. 31, 1954, to Doty et al. By this method a vibratory signal of more than one cycle is transmitted for a period of time longer than the duration of the input signal produced by a conventional seismic explosion or single impact signal. The signal of more than one cycle has a changing frequency pattern from the start of the signal to the end of the signal. By this means, energy is transmitted by a continuous or semicontinuous process over a period of time and is then analyzed. Such an energy transmission of substantial duration is more effective than the energy generated during a few microseconds such as by an explosion or a single impact even though the energy wave of the explosion may be many times greater in magnitude than the signal produced for exploration by the continuous method.

2. Description of the prior art

Customarily, marine seismographic prospecting is conducted by using at least one ship which tows a hydrophone cable to which is attached a plurality of hydrophones at spaced intervals along the cable. In the most common operation, the ship proceeds along a predetermined course until it reaches a location at which data is to be taken. The ship then disengages its engines allowing the ship and cable to drift. An explosive charge is then detonated several hundred feet to one side of the center of the hydrophone cable. This charge may be released from the first vessel by means of a cable or may be dropped by a second vessel traveling a parallel course with the first one. Sound waves produced by the detonation of the explosive travel through the water and into the geological formation beneath. The sound waves are reflected from various interfaces in the geologic section and returned through the water to the hydrophones. The hydrophones convert the sound waves into electrical impulses which are transmitted up the cable to the recording vessel where they are recorded in several modes well known to the art. There have, however, been developed in the recent past, streamer-marine geophone cables that can record while being moved through the water. Such geophone cables are described in U.S. Patent No. 2,465,696 issued in 1949 to Paslay. By means of such devices which are responsive to variations of pressure set up within the surrounding water by the seismic signals without contact of the detectors with the earth's surface beneath the water, it is possible to detect and record the seismic signals while the vessel containing the seismic recording equipment is proceeding along a predetermined course. For marine explorations the primary method of producing the seismic signal other than by means of an explosion has been by means of a powerful single sound impulse. Such systems include the air impulse system known to the art as the PAR system, a trade name of Bolt Associates, Inc., Norwalk, Conn., cyclical systems of the type such as the Vibroseis system, a trade name of Continental Oil Co., and the impulsive system known as Dinoseis, a trade name of Sinclair Oil Co., in which an explosive mixture of propane and oxygen is detonated within a closed cylinder, one end of which is in contact with the water body and movable in response to the explosive force.

Prior art methods generally involve towing the impulse generator over the side or astern and at considerable depth to reduce the adverse effects of the water surface. For efficient operation it has been necessary in the prior art to tow the impulse or signal generator at a depth of approximately thirty-five to fifty feet below the water surface.

In impulse signal generating apparatus of the type known to the art, it is necessary to position the signal generating point of the apparatus at a predetermined substantial depth in the water. For example, in the Vibroseis and similar systems of marine seismic signal generation the signal is generated by oscillating a diaphragm at a predetermined frequency to transmit energy waves through the body of water by mechanical generation of a sound wave from a surface exposed to the water. Such a diaphragm must be positioned at a depth of thirty-five to fifty feet in the water to be effective. By prior art and with prior art apparatus the signal generating apparatus is suspended over the side or astern of the vessel to a depth of thirty-five to fifty feet. In accordance with the prior art, placement of the apparatus is sometimes achieved as an inboard system by attaching the housing of the signal generating apparatus in watertight connection with an opening through the bottom of the vessel. When it is necessary to replace or repair certain parts of the apparatus, the watertight integrity of the hull is maintained only by a diaphragm across the opening. In some prior art systems a seismic energy source is mounted external to the hull beneath the waterline and is thus accessible only by means of divers or through placing the vessel in drydock.

SUMMARY OF THE INVENTION

The present invention provides a vessel which includes such or similar types of seismic energy sources. In general terms, the present invention comprises a vessel having one or a plurality of wells through the hull of the vessel. Each of the wells is defined by a closed cylindrical wall extending through the hull of the vessel from a point beneath the waterline to the deck area. Each well is so constructed and arranged as to receive a signal transmission assembly. Means are provided in combination with the vessel for handling and placing the signal transmission assemblies.

In accordance with the present invention, by positioning the signal transmission apparatus in a well of a vessel with the signal transmission point immediately beneath the hull of the vessel, the signal transmission point is controlled by the draft of the vessel and in current practice is customarily eight to twelve feet below the water surface. The horizontal projection of the hull surface required to provide a baffle in accordance with the present invention is substantially greater than the area of the transducer at the transducer depth. The exact ratio of areas is a function of many parameters including the shape of the hull, the frequency of the signal, and the seismic energy source depth which is, of course, dependent upon the draft of the vessel. A precise mathematical determination is therefore difficult. It has been found, however, in accordance with the present invention that efficient and reliable baffling is obtained when the horizontal projection of the hull provides an area surrounding the transducer whose minimum linear dimension is from one to two times the radius of the transducer surface when the transducer is intended to operate at a seismic signal frequency of from ten to sixty cycles per second.

It is a primary object of the present invention to provide an improved seismic exploration vessel capable of efficient operation with signal generating equipment readily accessible from one working deck.

It is another object of the present invention to provide an improved seismic exploration vessel, the bottom of whose hull acts as a baffle for the seismic signal generation to provide efficient operation.

Another object of the present invention is to provide such a seismic exploration vessel in which the seismic exploration can be carried out while the vessel is underway.

A further object of the present invention is to provide such a seismic exploration vessel which can be alternatively employed for impulsive or continuous signal transmission.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

In the drawings:

FIGURE 1 is a plan view of an illustrative embodiment of a seismic survey vessel constructed in accordance with the present invention;

FIGURE 2 is a view in elevation of the vessel of FIGURE 1;

FIGURE 3 is an enlarged partial view in section taken along the centerline of the vessel of FIGURE 1; and, FIGURE 4 is a plan view of an alternative embodiment of the present invention.

Although the present invention is described hereinafter in connection with seismic surveying by the reflection method and particularly with respect to the generation of cyclic signals of varying frequency it is to be understood that the present invention is equally applicable to the generation of impulse type signals for other purposes.

DESCRIPTION OF THE PREFERRED EMBODIMENTS

The present invention permits operation of signal generating apparatus at the relatively shallow depth of the the hull bottom by using the bottomas a baffle and at the same time obviates the difficulties of the prior art inboard systems and provides a marine seismic exploration vessel in which a plurality of such transmitting apparatus can be employed for multiple or phased signal transmission.

Referring now to the drawing there is shown in FIGURE 1 an illustrative embodiment of a vessel in accordance with the present invention utilizing two signal transmission means. As shown in FIGURES 1, 2 and 3, two wells 10 and 11 are provided through the hull 12 of the ship extending from a working deck 14 through the lower plate 15 of the hull. The wells are longitudinally spaced apart and are positioned symmetrically on the centerline of the vessel. Each well is defined by a cylindrical vertical wall 10a and 11a which is of the same watertight integrity as the hull of the vessel. The diameter or cross-sectional configuration of each well is such that it is mateable with the exterior configuration of a signal transmission apparatus 16 positioned therein. Conventional pneumatic tired wheels 17 may be used to center and guide the transmission apparatus without providing a rigid connection which would transmit signals into the hull. Thus, in the embodiment shown, two similar signal transmission apparatus are utilized and are each removably positioned within a respective well in the operating condition of the vessel. As shown particularly in FIGURE 3, suitable fairings 18 are formed surrounding the well opening at the bottom of the hull and an inwardly protruding flange 19 is provided at the lower end of the well for positioning and retaining the signal transmission apparatus in the operative position. The fairings and flange 19 are so constructed and arranged as to minimize turbulence surrounding the lower end of the signal transmission apparatus and to position such lower end substantially flush with the lower surface of the hull of the vessel or protruding therefrom.

It is preferable, also, to provide a cover (not shown) for closing the lower end of the well when the ship is underway without the signal apparatus in place. Although such covers need not prevent the wells from filling with water to the waterline, they will minimize underway turbulence within the wells and the consequent diminution of ship's speed. Only the exterior of the signal transmission apparatus is shown in FIGURES 1–4.

An attaching means such as an eye member 24 is affixed to each of the signal transmission units and handling equipment is positioned on the working deck to raise and lower the units from and into position in the respective well. Thus, in the illustrative embodiment shown, a track 26 is located on the working deck extending longitudinally adjacent the wells. A draw-works 27 and power unit 28 of the conventional type are then mounted on the deck to operate a hoisting cable 29 carried over the crown block of a hoisting mast 30 which is movably positioned on the track. A control unit 31, to which the air control and liquid lines 21 and 22 extending from the signal transmission units are connected, is positioned at a convenient location on the vessel.

Referring now to FIGURE 4, an alternative embodiment of the present invention is shown with six wells and signal transmission units located at opposite sides of, and symmetrically with respect to, the centerline of the vessel.

Although the present invention has been described with particular reference to non-explosive cyclical signal generating apparatus, the vessel of the present invention is equally adaptable to the use of impulsive signal generating equipment, and particularly that type of equipment known by the trade name Dinoseis described hereinbefore, as well as signal impulse equipment such as the air impulse systems known generally as PAR systems. In connection with the use of various types of signal generation equipment it is sometimes advantageous or necessary to operate such equipment at a moderate depth below the lower end of the well. In such instances the equipment is lowered a sufficient amount to protrude from the bottom of the ship to the requisite depth.

In a typical embodiment when the signal transmission apparatus is positioned in the well of the vessel with the transducing surface substantially coincident with the lower surface of the hull line at the well opening the transducer surface or signal transmission point is approximately eight to twelve feet below the waterline in a vessel of the type typically used for marine seismic exploration. As pointed out hereinbefore, it has been found that in accordance with the present invention, a baffling zone of from one to two times the radius of the transducer is required for efficient baffling of the signal. Thus, in a presently preferred embodiment utilizing a signal transmitting apparatus with a transducer surface approximately five feet in diameter, a horizontal projection of the hull surface surrounding the transducer extends at least 2½ to 5 feet around the transducer when the seismic frequencies to be employed are in the range of ten to sixty cycles per second. It has been found that an increase of all dimensions improves efficiency of signal transmission especially for lower frequencies. It has also been found that the boundary of the hull projection in a horizontal plane may be somewhat nearer to one transducer than the radius of the transducer without seriously affecting signal level, provided that the major part of the hull projection extends substantially farther than one transducer radius from the transducer.

The apparatus of the present invention achieves such efficient seismic signal transmission while providing a marine seismic vessel which can be operated underway. Additionally the watertight integrity of the vessel is preserved and work can be performed on the signal transmission apparatus units or such units can be replaced also while underway.

In prior art devices and methods of seismic undersea exploration it has been necessary to trail the equipment behind the ship or extend it from the side thereof. Such operation creates a substantial drag on the vessel and creates severe handling problems, particularly in rough seas, together with necessitating considerable handling equipment, which problems and extensive equipment are obviated by the present invention. Further, the streaming of the equipment, either astern or over the side, entails the use of lengthy lines for the supply of requisite fuel, air and control lines for the equipment. These lines and the towing lines are subject to damaging flexure and are apt to tangle upon themselves or with other towed equipment, such as, for example, the hydrophone cable signal detecting means described hereinbefore. By means of the present invention, such lines and hoses are substantially shortened and subjected to practically no operational and handling stresses. Additionally, in such prior art methods and utilizing prior art equipment it has been necessary to operate the signal generating apparatus at a considerable depth, as for example, thirty-five feet, in order that the signals were properly directed toward the sea floor. By means of the present invention the ship's bottom forms a baffle for the signal waves and causes them to be propagated downward more efficiently. Accordingly, such wave propagation is more efficient and the signal generating equipment is employed more efficiently at a lesser depth than required by methods and with apparatus known to the prior art.

What is claimed is:
1. A marine seismic vessel comprising:
 a floating vessel;
 a well extending through the hull of said vessel from the lower surface of said hull upwardly to a working deck above the water line, said well being defined by a watertight cylindrical wall extending through said hull;
 a seismic generator removably positioned within said well, said generator having a sound generating surface which transmits sound signals through the surrounding water by mechanical generation of an acoustic wave from said sound surface, and said sound surface being at a depth not substantially less than that of said lower surface whereby said generator is capable of operating while said vessel is moving;
 a fluid energy source on said vessel for supplying said generator with an energy medium for generating said signals; and
 said generator and said well being so located relative to said lower surface that the area of projection of said hull on a horizontal plane is at least equal to the area of projection of said signal generator, thereby allowing said hull to baffle the sound signals emitted by said sound surface.

References Cited

UNITED STATES PATENTS

| | | |
|---|---|---|
| 996,395 | 6/1911 | Bailey. |
| 1,189,027 | 6/1916 | Williams et al. _____ 116—27 |
| 2,519,360 | 8/1950 | Dow. |
| 3,228,368 | 1/1966 | Deal et al. _____ 114—0.5 |

MILTON BUCHLER, Primary Examiner.

TRYGVE M. BLIX, Examiner.